United States Patent [19]

Dumbaugh, Jr. et al.

[11] Patent Number: 5,374,595

[45] Date of Patent: Dec. 20, 1994

[54] HIGH LIQUIDUS VISCOSITY GLASSES FOR FLAT PANEL DISPLAYS

[75] Inventors: William H. Dumbaugh, Jr., Painted Post; Josef C. Lapp; Dawne M. Moffatt, both of Corning, all of N.Y.

[73] Assignee: Corning Incorporated, Corning, N.Y.

[21] Appl. No.: 155,483

[22] Filed: Nov. 22, 1993

Related U.S. Application Data

[63] Continuation-in-part of Ser. No. 8,560, Jan. 22, 1993, abandoned.

[51] Int. Cl.$^5$ .............................................. C03C 3/091
[52] U.S. Cl. ........................................ 501/66; 501/69; 501/70; 501/72; 359/82
[58] Field of Search .................. 501/55, 63, 64, 66, 501/69, 70, 72; 359/82

[56] References Cited

U.S. PATENT DOCUMENTS

| | | | |
|---|---|---|---|
| 3,338,696 | 8/1967 | Dockerty | 65/145 |
| 3,682,609 | 8/1972 | Dockerty | 65/83 |
| 4,012,263 | 3/1977 | Shell | 501/70 |
| 4,396,720 | 8/1983 | Beall et al. | 501/66 |
| 4,409,337 | 10/1983 | Dumbaugh | 501/66 |
| 4,562,161 | 12/1985 | Mennemann et al. | 501/66 |
| 4,824,808 | 4/1989 | Dumbaugh | 501/66 |
| 5,116,787 | 5/1992 | Dumbaugh | 501/66 |
| 5,116,788 | 5/1992 | Dumbaugh | 501/66 |
| 5,116,789 | 5/1992 | Dumbaugh | 501/66 |

*Primary Examiner*—Mark L. Bell
*Assistant Examiner*—Deborah Jones
*Attorney, Agent, or Firm*—C. S. Janes, Jr.

[57] ABSTRACT

This invention is related to glasses for use as substrates in flat panel display devices; more specifically, for use as substrates in LCDs which utilize polycrystalline silicon thin film transistors. The compositions for the inventive glasses are essentially free from alkali metal oxides and consist essentially, in mole percent, of

| | | | |
|---|---|---|---|
| $SiO_2$ | 64–70 | $Y_2O_3$ | 0–5 |
| $Al_2O_3$ | 9.5–14 | MgO | 0–5 |
| $B_2O_3$ | 5–10 | CaO | 3–13 |
| $TiO_2$ | 0–5 | SrO | 0–5.5 |
| $Ta_2O_5$ | 0–5 | BaO | 2–7 |
| $Nb_2O_5$ | 0–5 | MgO + CaO + SrO + BaO | 10–20. |

30 Claims, No Drawings

HIGH LIQUIDUS VISCOSITY GLASSES FOR FLAT PANEL DISPLAYS

This application is a continuation-in-part application of application Ser. No. 08/008,560, filed January 22, 1993, and now abandoned.

RELATED APPLICATION

U.S. application Ser. No. 08/8561, filed concurrently with application Ser. No. 08/008,560 under the title BARIUM ALUMINOSILICATE GLASSES and now abandoned, is directed to glasses particularly designed for use as substrates in liquid crystal display devices employing polysilicon thin film transistors as switches. Those glasses exhibit strain points of at least 660° C., liquidus temperatures no higher than 1175° C., viscosities at the liquidus temperature of at least 600,000 poises (60,000 Pa.s), and weight losses of less than 1 mg/cm$^2$ after immersion for 24 hours in an aqueous 5% by weight HCl solution at 95° C., the glasses being essentially free from alkali metal oxides and consisting essentially, expressed in terms of mole percent on the oxide basis, of

| | | | | | |
|---|---|---|---|---|---|
| $SiO_2$ | 65–78 | Mgo | 0–5 | $ZrO_2$ | 0–2.5 |
| $Al_2O_3$ | 7–11 | CaO | 0–10 | $TiO_2$ | 0–3 |
| BaO | 12–19 | SrO | 0–10 | $Ta_2O_5$ | 0–3 |
| $B_2O_3$ | 0–5 | MgO + CaO + SrO | 0–15 | $ZrO_2 + TiO_2 + Ta_2O_5$ | 0–5 |

1. Field of the Invention

This invention is directed to the production of glass compositions exhibiting high viscosities at their liquidus temperatures. More particularly, this invention is directed to such glasses demonstrating chemical and physical characteristics rendering them especially suitable for use as substrates in flat panel display devices.

2. Background of the Invention

Liquid crystal displays (LCDs) are passive displays which depend upon external sources of light for illumination. They are manufactured as segmented displays or in one of two basic configurations. The substrate needs (other than being transparent and capable of withstanding the chemical conditions to which it is exposed during display processing) of the two matrix types vary. The first type is intrinsic matrix addressed, relying upon the threshold properties of the liquid crystal material. The second is extrinsic matrix or active matrix (AM) addressed, in which an array of diodes, metal-insulator-metal (MIM) devices, or thin film transistors (TFTs) supplies an electronic switch to each pixel. In both cases, two sheets of glass form the structure of the display. The separation between the two sheets is the critical gap dimension, of the order of 5–10 μm.

Intrinsically addressed LCDs are fabricated using thin film deposition techniques at temperatures $\leq 350°$ C., followed by photolithographic patterning. As a result, the substrate requirements therefor are often the same as those for segmented displays. Soda-lime-silica glass with a barrier layer has proven to be adequate for most needs. A high performance version of intrinsically addressed LCDs, the super twisted nematic (STN) type, has an added requirement of extremely precise flatness for the purpose of holding the gap dimensions uniform. Because of that requirement, soda-lime-silica glass used for those displays must be polished or, alternatively, a precision formed, barium aluminoborosilicate glass marketed by Corning Incorporated, Corning, New York, as Code 7059 may be used without polishing.

Extrinsically addressed LCDs can be further subdivided into two categories; viz., one based on MIM or amorphous silicon (a-Si) devices, and the other based on polycrystalline silicon (poly-Si) devices. The substrate requirements of the MIM or a-Si type are similar to the STN application. Corning Code 7059 sheet glass is the preferred substrate because of its very low sodium content, i.e., less than 0.1% $Na_2O$ by weight, its dimensional precision, and its commercial availability. Devices formed from poly-Si, however, are processed at higher temperatures than those that are employed with a-Si TFTs. Substrates capable of use temperatures (taken to be 25° C. below the strain point of the glass) of 600°–800° C. are demanded. The actual temperature required is mandated by the particular process utilized in fabricating the TFTs. Those TFTs with deposited gate dielectrics require 600°–650° C., while those with thermal oxides call for about 800° C. Both a-Si and poly-Si processes demand precise alignment of successive photolithographic patterns, thereby necessitating that the thermal shrinkage of the substrate be kept low. Those temperatures have mandated the use of glasses exhibiting higher strain points than soda-lime-silica glass and Corning Code 7059 glass in order to avoid thermal deformation of the sheet during processing. As can be appreciated, the lower the strain point, the greater this dimensional change. Thus, there has been considerable research to develop glasses demonstrating high strain points so that thermal deformation is minimized during device processing at temperatures greater than 600° C., and preferably, higher than 650° C.

U.S. Pat. No. 4,824,808 (Dumbaugh, Jr.) lists four properties which have been deemed mandatory for a glass to exhibit in order to fully satisfy the needs of a substrate for LCDs:

First, the glass must be essentially free of intentionally added alkali metal oxide to avoid the possibility that alkali metal from the substrate can migrate into the transistor matrix;

Second, the glass substrate must be sufficiently chemically durable to withstand the reagents used in the TFT matrix deposition process;

Third, the expansion mismatch between the glass and the silicon present in the TFT array must be maintained at a relatively low level even as processing temperatures for the substrates increase; and Fourth, the glass must be capable of being produced in high quality thin sheet form at low cost; that is, it must not require extensive grinding and polishing to secure the necessary surface finish.

That last requirement is most difficult to achieve inasmuch as it demands a sheet glass production process capable of producing essentially finished glass sheet, such as the overflow downdraw sheet manufacturing process described in U.S. Pat. No. 3,338,696 (Dockerty) and U.S. Pat. No. 3,682,609 (Dockerty). That process requires a glass exhibiting a very high viscosity at the liquidus temperature plus long term stability, e.g., periods of 30 days, against devitrification at melting and forming temperatures.

Corning Code 7059 glass, supra, is currently employed in the fabrication of LCDs. That glass, consisting essentially, in weight percent, of about 50% $SiO_2$, 15% $B_2O_3$, 10% $Al_2O_3$, and 24% BaO, is nominally free of alkali metal oxides, and exhibits a linear coefficient of thermal expansion (25°–300° C.) of about $46 \times 10^{-7}$/° C. and a viscosity at the liquidus temperature in excess of 600,000 poises ($6 \times 10^4$ Pa.s). The high liquidus viscosity of the glass enables it to be drawn into sheet via the overflow downdraw sheet processing technique, but its relatively low strain point (~593° C.) is adequate only for processing a-Si devices and not for poly-Si devices.

The glasses of U.S. Pat. No. 4,824,808, supra, were designed to meet the requirements for use in fabricating poly-Si devices, including the capability of being formed into sheet by the overflow downdraw sheet processing technique, and linear coefficients of thermal expansion as low as about $36.5 \times 10^{-7}$/° C. (25°–300° C.), such as to closely match that of silicon, thereby enabling a silicon chip to be sealed directly thereon, but their strain points were less than 650° C.

The glasses of U.S. Pat. No. 4,409,337 (Dumbaugh, Jr.) were also considered for LCD substrates, but their long term stability against devitrification was feared to be insufficient for their use in the overflow downdraw sheet processing technique.

The glasses of U.S. Pat. No. 5,116,787 (Dumbaugh, Jr.) are essentially free from alkali metal oxides and MgO and demonstrate strain points of 655° C. and higher, with viscosities at the liquidus greater than $1.5 \times 10^5$ poises ($1.5 \times 10^4$ Pa.s). Although designed for use in the overflow downdraw sheet processing technique, their long term stability against devitrification was found to be marginal when employed in the process, some crystallization being formed in the glass during manufacture. Also, the linear coefficients of thermal expansion (25°–300° C.) generally ranged in the upper 40s to low $50s \times 10^{-7}$/° C., undesirably high for matching that of silicon (~$35 \times 10^{-7}$/° C.).

U.S. Pat. No. 5,116,788 (Dumbaugh, Jr.) discloses other glasses exhibiting high strain points, i.e., greater than 675° C., but having such relatively low viscosities at the liquidus temperature, viz., 20,000–200,000 poises (2,000–20,000 Pa.s), as to be subject to devitrification when formed utilizing the overflow downdraw sheet processing technique.

Finally, U.S. Pat. No. 5,116,789 (Dumbaugh, Jr. et al.) describes other glass compositions demonstrating strain points higher than 675° C., but their linear coefficients of thermal expansion (25°–300° C.) range from $45$–$62 \times 10^{-7}$/° C., too high to form a high temperature match with silicon.

A recent advance in liquid crystal technology termed "chip-on-glass" (COG) has further emphasized the need for the substrate glass to closely match silicon in thermal expansion. Thus, the initial LCD devices did not have their driver chips mounted on the substrate glass. Instead, the silicon chips were mounted remotely and were connected to the LCD substrate circuitry with compliant or flexible wiring. As LCD device technology improved and as the devices became larger, these flexible mountings became unacceptable, both because of cost and of uncertain reliability. This situation led to Tape Automatic Bonding (TAB) of the silicon chips. In that process the silicon chips and electrical connections to the chips were mounted on a carrier tape, that subassembly was mounted directly on the LCD substrate, and thereafter the connection to the LCD circuitry was completed. TAB decreased cost while improving reliability and increasing the permitted density of the conductors to a pitch of approximately 200 $\mu$m—all significant factors. COG, however, provides further improvement over TAB with respect to those three factors. Hence, as the size and quality requirements of LCD devices increase, COG is demanded for those devices dependent upon the use of integrated circuit silicon chips. For that reason, the substrate glass must demonstrate a linear coefficient of thermal expansion closely matching that of silicon; i.e., the glass must exhibit a linear coefficient of thermal expansion (0°–300° C.) between $32$–$46 \times 10^{-7}$/° C., most preferably $32$–$40 \times 10^{-7}$/° C.

SUMMARY OF THE INVENTION

The present invention is founded in the discovery of glass exhibiting linear coefficients of thermal expansion over the temperature range of 0°–300° C. between $32$–$46 \times 10^{-7}$/° C., strain points higher than 650° C., liquidus temperatures no higher than 1200° C., liquidus viscosities greater than about 200,000 poises (20,000 Pa.s), a weight loss of less than 2 mg/cm$^2$ after immersion for 24 hours in an aqueous 5% by weight HCl solution at 95° C., long term stability against devitrification at melting and forming temperatures, and melting viscosities of about 200 poises (20 Pa.s) at less than 1675° C., the glasses being essentially free from alkali metal oxides and consisting essentially, expressed in terms of mole percent on the oxide basis, of

| | | | |
|---|---|---|---|
| $SiO_2$ | 64–70 | $Y_2O_3$ | 0–3 |
| $Al_2O_3$ | 9.5–14 | MgO | 0–5 |
| $B_2O_3$ | 5–10 | CaO | 3–13 |
| $TiO_2$ | 0–5 | SrO | 0–5.5 |
| $Ta_2O_5$ | 0–5 | BaO | 2–7 |
| $Nb_2O_5$ | 0–5 | MgO + CaO + SrO + BaO | 10–20 |

Because of their deleterious effect upon the electrical properties of the glasses, the alkali metal oxides will most preferably be totally absent therefrom.

Adherence to those composition intervals has been found to be vital in securing glasses demonstrating properties desired for LCD substrate glasses to be employed in poly-Si devices. To illustrate:

If the $SiO_2$ content is below 64%, the strain point will be too low and the resistance of the glass to attack by acid will be poor. On the other hand, when the concentration of $SiO_2$ exceeds 70%, the glass becomes difficult to melt at customary glass melting temperatures.

The level of $Al_2O_3$ is critical to obtain a minimum liquidus temperature; that is, if the concentration of $Al_2O_3$ falls below 9.5% or exceeds 14%, the liquidus temperature can exceed 1200° C.

$B_2O_3$ tends to improve the viscosity character of the glass thereby making it easier to process. Where the level of $B_2O_3$ is less than 5%, the liquidus temperature becomes too high. At contents above 10% $B_2O_3$, the resistance to attack by acid is sacrificed and the strain point becomes too low.

The alkaline earth metal oxides modify the melting and physical properties of the glass. If the total thereof exceeds 20%, however, the linear coefficient of thermal expansion becomes too high. SrO and BaO raise the thermal expansion more than either MgO or CaO and, hence, will individually not exceed 7%. Because CaO also raises the thermal expansion, but at a slower rate than SrO or BaO, the total thereof ought not to exceed 13%. MgO appears to exert a beneficial effect upon the liquidus temperature at low levels, but, at concentrations greater than 5%, the liquidus temperature appears to rise.

The inclusion of $TiO_2$ is useful in lowering the coefficient of thermal expansion of the glass. The presence of $Ta_2O_5$ not only lowers the coefficient of thermal expansion of the glass but also raises the strain point of the glass and significantly improves the chemical durability thereof. $Nb_2O_5$ and $Y_2O_3$ appear to reduce the coefficient of thermal expansion of the glass and lower the liquidus temperature thereof.

In the preferred glasses the level of $Al_2O_3$ will exceed that of $B_2O_3$ and in the most preferred glasses the composition will consist essentially, expressed in terms of mole percent, of about

| | | | |
|---|---|---|---|
| $SiO_2$ | 65–69 | MgO | 1–5 |
| $Al_2O_3$ | 10–12 | CaO | 3–9 |
| $B_2O_3$ | 7–10 | SrO | 1–3 |
| $TiO_2$ | 0–3 | BaO | 2–5 |
| $Ta_2O_5$ | 0–3 | MgO + CaO + SrO + BaO | 11–16 | wherein the ratio $Al_2O_3:B_2O_3 > 1$. The glasses will exhibit a linear coefficient of thermal expansion (0°–300° C.) of $32-40 \times 10^{-7}$/° C., a liquidus temperature no higher than 1125° C., and a viscosity at the liquidus temperature greater than 600,000 poises (60,000 Pa.s).

DESCRIPTION OF PREFERRED EMBODIMENTS

Table I records a number of glass compositions, expressed in terms of parts by weight on the oxide basis, illustrating the compositional parameters of the present invention. Inasmuch as the sum of the individual constituents totals or very closely approximates 100, for all practical purposes the reported values may be deemed to represent weight percent. The actual batch ingredients may comprise any materials, either oxides or other compounds, which, when melted together with the other batch components, will be converted into the desired oxide in the proper proportions. For example, $SrCO_3$ and $CaCO_3$ can provide the source of SrO and CaO, respectively.

The batch ingredients were compounded, tumble mixed together thoroughly to aid in producing a homogeneous melt, and charged into platinum crucibles. After placing lids thereon, the crucibles were moved into furnaces operating at temperatures of 1600°–1650° C. To assure the production of inclusion- and cord-free glasses a two step melting procedure was used. In the first step the batch was melted for about 16 hours, stirred and then poured as a fine stream into a water bath, a process termed "drigaging" in the glass art. In the second step the finely-divided glass particles from the drigaging were remelted at 1600°–1650° C. for about four hours, the melts stirred in both directions (clockwise and counterclockwise), the melts thereafter poured onto steel plates to make glass slabs having dimensions of about 18"×6"×0.5" (~45.7×15.2×1.3 cm), and those slabs transferred immediately to an annealer operating at about 730° C.

Whereas the above description reflects a laboratory melting procedure, it must be appreciated that the inventive glasses are capable of being melted and formed employing large scale, commercial glass melting and forming equipment. Thus, the glasses are specifically designed to be drawn into thin sheet utilizing the overflow downdraw sheet processing technique. For the experimental glasses described herein, arsenic and/or antimony in amounts of about 0–1% and 0–0.5%, respectively, were added to each batch to perform their customary function as a fining agent. The small residual remaining in the glass has no substantial effect upon the properties of the glass.

Table I also lists measurements of several chemical and physical properties determined on the glasses in accordance with techniques conventional in the glass art. Thus, the linear coefficient of thermal expansion (Exp.) over the temperature range 0°–300° C. expressed in terms of $\times 10^{-7}$/° C., and the softening point (S.P.), annealing point (A.P.), and strain point (St.P.) expressed in terms of ° C., were determined by fiber elongation. The durability (Dur.) in HCl was determined by measuring the weight loss (mg/cm$^2$) after immersion in a bath of aqueous 5% by weight HCl at 95° C. for 24 hours.

The liquidus temperatures of the glasses were measured via two different methods. The standard liquidus method (Liq.) involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. A second method termed the "meltback liquidus" (M.Liq.) contemplates placing a glass sample which has been precrystallized by holding at a temperature of 1000° C. for 24 hours in a platinum boat, heating the boat in an appropriate temperature region in a gradient furnace for 24 hours, and then determining by microscopic examination the lowest temperature at which crystals are not observed in the interior of the glass. Generally, the liquidus temperatures measured by these two techniques do not differ by more than 50° C., with the "meltback liquidus" typically being higher than the standard liquidus temperature.

Table IA records the same glass compositions expressed in terms of mole percent on the oxide basis, the content of the fining agents being omitted as their presence in the final glass is small and has no substantive effect upon the overall properties of the glass.

| | 1 | 2 | 3 | 4 | 5 | 6 | 7 |
|---|---|---|---|---|---|---|---|
| $SiO_2$ | 57.0 | 57.3 | 56.8 | 59.3 | 55.0 | 59.2 | 55.8 |
| $Al_2O_3$ | 15.1 | 14.7 | 15.3 | 15.7 | 14.5 | 15.6 | 17.3 |
| $B_2O_3$ | 8.57 | 8.61 | 8.55 | 4.89 | 8.28 | 8.90 | 8.59 |
| MgO | 0.70 | 0.70 | 0.70 | 0.73 | 0.68 | 0.73 | 0.702 |
| CaO | 7.64 | 7.67 | 7.61 | 7.95 | 10.8 | 4.13 | 6.51 |
| SrO | 1.80 | 1.81 | 1.80 | 1.87 | 1.74 | 1.87 | 1.81 |
| BaO | 9.11 | 9.15 | 9.08 | 9.48 | 8.79 | 9.45 | 9.13 |
| $As_2O_3$ | 0.3 | 0.3 | 0.3 | 0.3 | 0.3 | 0.3 | 0.3 |
| $Sb_2O_3$ | 0.5 | 0.5 | 0.5 | 0.5 | 0.5 | 0.5 | 0.5 |

-continued

| | | | | | | | |
|---|---|---|---|---|---|---|---|
| Exp. | 43.0 | 42.9 | 43.1 | 43.7 | 47.4 | 38.1 | 41.0 |
| S.P. | 924 | 922 | 926 | 961 | 894 | 972 | 950 |
| A.P. | 705 | 703 | 704 | 733 | 725 | 725 | 722 |
| St.P. | 656 | 653 | 656 | 680 | 669 | 668 | 671 |
| Dur. | 1.12 | — | — | — | 1.94 | 1.88 | — |
| M.Liq. | 1075 | 1080 | 1085 | 1150 | 1080 | 1070 | 1115 |

| | 8 | 9 | 10 | 11 | 12 | 13 | 14 | 15 |
|---|---|---|---|---|---|---|---|---|
| $SiO_2$ | 57.1 | 57.1 | 59.1 | 58.5 | 57.2 | 57.8 | 56.4 | 59.4 |
| $Al_2O_3$ | 14.7 | 14.8 | 15.6 | 15.6 | 16.5 | 15.4 | 16.0 | 17.4 |
| $B_2O_3$ | 6.22 | 7.0 | 8.31 | 8.3 | 9.53 | 8.2 | 7.48 | 10.0 |
| MgO | 0.285 | 0.432 | 1.42 | 1.42 | 0.73 | 1.4 | 1.38 | 1.45 |
| CaO | 9.72 | 9.01 | 4.13 | 4.13 | 3.18 | 4.08 | 4.01 | 6.05 |
| SrO | 0.733 | 1.11 | 1.87 | 1.87 | 1.87 | 1.84 | 1.81 | *0.09 |
| BaO | 11.1 | 10.4 | 9.46 | 9.44 | 9.48 | 9.33 | 9.18 | 5.51 |
| $TiO_2$ | — | — | — | 0.69 | 1.38 | — | — | — |
| $Ta_2O_5$ | — | — | — | — | — | 1.87 | 3.68 | — |
| Exp. | 45.9 | 44.8 | 37.7 | 37.4 | 35.0 | 38 | 36.5 | 34.6 |
| S.P. | 925 | 924 | 969 | 964 | 971 | 969 | 973 | 966 |
| A.P. | 713 | 711 | 723 | 721 | 725 | 728 | 739 | 730 |
| St.P. | 667 | 660 | 667 | 664 | 667 | 670 | 681 | 676 |
| Dur. | 0.3 | 0.4 | 0.86 | 0.7 | 1.28 | 0.6 | 0.28 | 1.6 |
| M.Liq. | 1095 | 1110 | — | — | — | — | — | — |
| Liq. | — | — | 1065 | 1060 | 1090 | 1055 | 1055 | 1085 |

*Impurity in $BaCO_3$ batch material. None purposely added.

TABLE IA

| | 1 | 2 | 3 | 4 | 5 | 6 | 7 |
|---|---|---|---|---|---|---|---|
| $SiO_2$ | 65.4 | 65.6 | 65.3 | 68.0 | 62.7 | 68.5 | 64.8 |
| $Al_2O_3$ | 10.2 | 9.9 | 10.4 | 10.6 | 9.8 | 10.7 | 11.8 |
| $B_2O_3$ | 8.55 | 8.5 | 8.5 | 4.8 | 8.1 | 8.9 | 8.61 |
| MgO | 1.2 | 1.2 | 1.2 | 1.2 | 1.1 | 1.2 | 1.22 |
| CaO | 9.4 | 9.4 | 9.4 | 9.8 | 13.2 | 5.1 | 8.1 |
| SrO | 1.2 | 1.2 | 1.2 | 1.2 | 1.1 | 1.2 | 1.22 |
| BaO | 4.1 | 4.1 | 4.1 | 4.2 | 3.9 | 4.3 | 4.15 |

| | 8 | 9 | 10 | 11 | 12 | 13 | 14 | 15 |
|---|---|---|---|---|---|---|---|---|
| $SiO_2$ | 65.8 | 65.7 | 68.1 | 67.5 | 66.5 | 67.7 | 67.3 | 66.7 |
| $Al_2O_3$ | 10.0 | 10.0 | 10.6 | 10.6 | 11.3 | 10.6 | 11.2 | 11.5 |
| $B_2O_3$ | 6.19 | 6.95 | 8.26 | 8.26 | 8.96 | 8.29 | 7.71 | 9.70 |
| MgO | 0.49 | 0.74 | 1.25 | 1.25 | 1.26 | 1.25 | 1.26 | 2.42 |
| CaO | 12.0 | 11.1 | 5.1 | 5.1 | 5.16 | 5.11 | 5.13 | 7.27 |
| SrO | 0.49 | 0.74 | 1.25 | 1.25 | 1.26 | 1.25 | 1.26 | — |
| BaO | 5.02 | 4.7 | 4.27 | 4.27 | 4.32 | 4.28 | 4.29 | 2.42 |
| $TiO_2$ | — | — | — | 0.59 | 1.2 | — | — | — |
| $Ta_2O_5$ | — | — | — | — | — | 0.3 | 0.6 | — |

Example 5 illustrates how a glass with high CaO and low $SiO_2$ can result in high thermal expansion coefficients.

Table II records a second group of glass compositions which were characterized more in depth, again expressed in terms of parts by weight on the oxide basis. Again, because the sum of the individual constituents totals or very closely approximates 100, for all practical purposes the values recited may be considered to reflect weight percent. And, in like manner to the compositions recorded in Table I, the actual batch ingredients may comprise any materials, either oxides or other compounds, which, when melted together, will be converted into the desired oxide in the proper proportions.

The batch ingredients were compounded, mixed together, melted, and shaped into glass slabs in accordance with the laboratory procedure outlined above for the glasses of Table I.

Table II also lists the measurements of chemical and physical properties conducted on the several glasses along with two additional determinations not performed on the glasses of Table I. First, the melting temperature [Melt, in ° C.] (defined as the temperature at which the glass melt demonstrates a viscosity of 200 poises [20 Pa.s]) has been added, being calculated employing the Fulcher equation as fit to the high temperature viscosity data. Second, the liquidus viscosity (Visc), also calculated using the Fulcher equation coefficients, was added, expressed in terms of ×100,000 poises (10,000 Pa.s). The liquidus temperature reported was determined in accordance with the standard liquidus method (Liq.). Finally, in like manner to the glass compositions of Table I, fining of the glass was accomplished by including arsenic and/or antimony in the glass batch.

Table IIA reports the same glass compositions expressed in terms of mole percent on the oxide basis, the concentration of fining agent being omitted because the small residual therefrom has no substantive effect upon the overall properties of the glass. Example No. 16 is a laboratory remelt of Example No. 6.

TABLE II

| | 16 | 17 | 18 | 19 | 20 | 21 | 22 | 23 |
|---|---|---|---|---|---|---|---|---|
| $SiO_2$ | 59.2 | 57.7 | 59.9 | 58.8 | 59.6 | 58.3 | 58.2 | 57.8 |
| $Al_2O_3$ | 15.6 | 15.2 | 15.8 | 15.5 | 15.8 | 16.5 | 16.5 | 17.0 |
| $B_2O_3$ | 8.90 | 8.67 | 9.01 | 8.84 | 8.96 | 8.94 | 8.32 | 8.94 |

TABLE II-continued

|      | | | | | | | | |
|------|------|------|------|------|------|------|------|------|
| MgO  | 0.73 | 0.71 | 0.74 | —    | —    | 0.73 | 1.42 | 0.73 |
| CaO  | 4.13 | 6.57 | 2.99 | 5.45 | 4.18 | 4.15 | 4.14 | 4.15 |
| SrO  | 1.87 | 1.82 | 1.89 | 1.86 | 1.88 | 1.87 | 1.87 | 1.87 |
| BaO  | 9.45 | 9.21 | 9.57 | 9.39 | 9.52 | 9.49 | 9.47 | 9.49 |
| Exp. | 37.5 | 42.0 | 36.2 | 39.5 | 37.2 | 38.1 | 37.1 | 37.2 |
| S.P. | 973  | 937  | 992  | 972  | 989  | 980  | 972  | 979  |
| A.P. | 721  | 707  | 730  | 722  | 732  | 731  | 730  | 735  |
| St.P.| 662  | 656  | 669  | 666  | 672  | 673  | 673  | 677  |
| Dur. | 0.62 | 1.04 | 0.52 | 0.63 | 0.52 | 0.72 | 1.1  | 1.12 |
| Liq. | 1065 | 1050 | 1085 | 1105 | 1070 | 1035 | 1020 | 1030 |
| Melt | 1645 | 1560 | 1670 | 1644 | 1670 | 1632 | 1619 | —    |
| Visc | 21   | 8.8  | 22   | 6.7  | 32   | 58   | 79   | —    |

|          | 24   | 25   | 26   | 27   | 28   | 29   | 30   | 31   |
|----------|------|------|------|------|------|------|------|------|
| $SiO_2$  | 61.3 | 58.4 | 58.1 | 57.3 | 57.5 | 55.4 | 54.5 | 48.0 |
| $Al_2O_3$| 14.4 | 17.1 | 16.5 | 16.5 | 12.5 | 16.0 | 16.3 | 12.8 |
| $B_2O_3$ | 9.8  | 9.85 | 7.11 | 8.35 | 7.5  | 7.07 | 7.22 | 6.73 |
| MgO      | 1.42 | 1.43 | 2.8  | 2.12 | —    | 4.43 | 3.13 | —    |
| CaO      | 3.95 | 3.97 | 4.13 | 4.15 | 2.5  | 2.37 | 8.23 | 10.8 |
| SrO      | 3.65 | 3.67 | 1.87 | 1.88 | —    | 7.01 | —    | 8.58 |
| BaO      | 5.4  | 5.42 | 9.45 | 9.5  | 20.0 | 7.78 | 10.6 | 10.7 |
| Exp.     | 37.2 | 35.8 | 39.1 | 38.6 | 43.9 | 41.3 | 44.5 | 59.4 |
| S.P.     | 970  | 969  | 953  | 957  | 917  | —    | 908  | —    |
| A.P.     | 719  | 730  | 722  | 726  | 702  | 719  | 703  | 670  |
| St.P.    | 664  | 674  | 670  | 676  | 653  | 674  | 657  | 627  |
| Dur.     | —    | 1.8  | 0.62 | 0.88 | 0.39 | 0.9  | 2.69 | 2.9  |
| Liq.     | —    | 1050 | 1075 | 1055 | 1080 | 1242 | 1086 | 1042 |
| Melt     | —    | 1610 | 1585 | 1595 | 1758 | —    | 1475 | —    |
| Visc     | —    | 29   | 8.0  | 17   | 14.8 | —    | 1.0  | —    |

|          | 32   | 33   | 34   | 35   | 36    | 37   | 38   |
|----------|------|------|------|------|-------|------|------|
| $SiO_2$  | 57.5 | 57.2 | 58.2 | 57.1 | 55.69 | 57.3 | 57.3 |
| $Al_2O_3$| 18.2 | 18.6 | 18.4 | 17.6 | 19.6  | 19.0 | 17.9 |
| $B_2O_3$ | 7.41 | 7.08 | 8.14 | 7.65 | 7.75  | 6.79 | 7.38 |
| MgO      | 1.42 | 1.76 | 1.44 | 1.41 | 1.43  | 1.42 | 1.41 |
| CaO      | 4.13 | 4.11 | 4.18 | 4.1  | 4.14  | 4.11 | 4.11 |
| SrO      | 1.87 | 1.86 | —    | —    | 1.88  | 1.86 | 1.86 |
| BaO      | 9.45 | 9.41 | 9.57 | 12.1 | 9.49  | 9.43 | 10.1 |
| Exp.     | 36.9 | 37.2 | 34.9 | 38.1 | 37.6  | 36.6 | 37.8 |
| S.P.     | 987  | 983  | 988  | 981  | 982   | 990  | 983  |
| A.P.     | 740  | 740  | 738  | 734  | 741   | 749  | 743  |
| St.P.    | 682  | 682  | 678  | 674  | 684   | 693  | 690  |
| Dur.     | 0.7  | 0.78 | 0.83 | 0.77 | 1.84  | 0.66 | 0.64 |
| Liq.     | 1080 | 1100 | 1090 | 1035 | 1145  | 1155 | 1090 |
| Melt     | 1600 | 1582 | 1607 | 1597 | 1581  | 1589 | 1593 |
| Visc     | 14   | 8    | 12   | >40  | 2.2   | 2.4  | 11   |

|           | 39   | 40   | 41   | 42   | 43   | 44   | 45   | 46   |
|-----------|------|------|------|------|------|------|------|------|
| $SiO_2$   | 56.3 | 56.8 | 57.2 | 55.8 | 56.4 | 55.3 | 55.5 | 55.7 |
| $Al_2O_3$ | 18.3 | 18.4 | 18.6 | 17.7 | 17.9 | 16.6 | 16.6 | 16.7 |
| $B_2O_3$  | 6.38 | 6.43 | 6.48 | 6.32 | 6.98 | 7.55 | 7.58 | 7.61 |
| MgO       | 1.39 | 1.4  | 1.41 | 1.38 | 1.39 | 2.07 | 2.08 | 2.08 |
| CaO       | 4.04 | 4.07 | 5.06 | 4.0  | 4.05 | 4.04 | 4.06 | 4.07 |
| SrO       | 1.83 | 3.6  | 1.86 | 1.81 | —    | 1.83 | 1.84 | 1.84 |
| BaO       | 11.83| 9.33 | 9.4  | 13.0 | 13.4 | 9.26 | 9.3  | 9.33 |
| $Ta_2O_5$ | —    | —    | —    | —    | —    | 2.79 | 1.87 | 0.94 |
| $Nb_2O_5$ | —    | —    | —    | —    | —    | 0.56 | 1.12 | 1.69 |
| Exp.      | 40.1 | 39.1 | 38.4 | 41.2 | 38.6 | 38.4 | 38.4 | 38.1 |
| S.P.      | 985  | 986  | 982  | 978  | 985  | 957  | 956  | 951  |
| A.P.      | 746  | 737  | 742  | 740  | 744  | 729  | 728  | 724  |
| St.P.     | 690  | 681  | 688  | 687  | 690  | 676  | 674  | 671  |
| Dur.      | 0.63 | 0.57 | 0.57 | 0.53 | 0.59 | 0.56 | 0.65 | 0.7  |
| Liq.      | 1130 | 1060 | 1120 | 1140 | 1080 | 1070 | 1065 | 1070 |
| Melt      | 1587 | 1597 | 1583 | 1586 | 1601 | —    | —    | —    |
| Visc      | 4    | 30   | 4.5  | 2.6  | 14   | —    | —    | —    |

|           | 47   | 48   | 49   | 50   | 51   |
|-----------|------|------|------|------|------|
| $SiO_2$   | 55.9 | 55.4 | 55.6 | 55.9 | 56.0 |
| $Al_2O_3$ | 16.8 | 16.6 | 16.6 | 16.7 | 16.8 |
| $B_2O_3$  | 7.64 | 7.56 | 7.6  | 7.63 | 7.65 |
| MgO       | 2.09 | 2.07 | 2.08 | 2.09 | 2.1  |
| CaO       | 4.09 | 4.05 | 4.06 | 4.08 | 4.1  |
| SrO       | 1.85 | 1.83 | 1.84 | 1.85 | 1.85 |
| BaO       | 9.37 | 9.27 | 9.31 | 9.35 | 9.38 |
| $Ta_2O_5$ | —    | 2.79 | 1.87 | 0.94 | —    |
| $Nb_2O_5$ | 2.26 | —    | —    | —    | 1.13 |
| $Y_2O_3$  | —    | 0.48 | 0.96 | 1.44 | 0.96 |
| Exp.      | 38.3 | 38.3 | 38.5 | 39.2 | 37.8 |
| S.P.      | 949  | 961  | 959  | 958  | 955  |
| A.P.      | 724  | 733  | 731  | 733  | 728  |
| St.P.     | 671  | 680  | 679  | 681  | 676  |
| Dur.      | 0.86 | 0.64 | 0.74 | 0.99 | 0.97 |

TABLE II-continued

| Liq. | 1065 | 1055 | 1065 | 1090 | 1090 |
|------|------|------|------|------|------|

TABLE IIA

|        | 16   | 17   | 18   | 19   | 20   | 21   | 22   | 23   |
|--------|------|------|------|------|------|------|------|------|
| $SiO_2$ | 68.5 | 66.4 | 69.5 | 68.2 | 69.4 | 67.7 | 67.3 | 67.3 |
| $Al_2O_3$ | 10.7 | 10.3 | 10.8 | 10.6 | 10.8 | 11.3 | 11.2 | 11.6 |
| $B_2O_3$ | 8.9 | 8.6 | 9.0 | 8.8 | 9.0 | 9.0 | 8.3 | 8.99 |
| MgO    | 1.2  | 1.2  | 1.3  | —    | —    | 1.3  | 2.5  | 1.27 |
| CaO    | 5.1  | 8.1  | 3.7  | 6.8  | 5.2  | 5.2  | 5.1  | 5.18 |
| SrO    | 1.2  | 1.2  | 1.3  | 1.2  | 1.3  | 1.3  | 1.3  | 1.27 |
| BaO    | 4.3  | 4.1  | 4.4  | 4.3  | 4.4  | 4.3  | 4.5  | 4.33 |

|        | 24   | 25   | 26   | 27   | 28   | 29   | 30   | 31   |
|--------|------|------|------|------|------|------|------|------|
| $SiO_2$ | 69.0 | 66.7 | 66.5 | 66.1 | 70.2 | 63.6 | 62.0 | 57.9 |
| $Al_2O_3$ | 9.52 | 11.5 | 11.1 | 11.2 | 9.0 | 10.8 | 11.0 | 9.1 |
| $B_2O_3$ | 9.52 | 9.7 | 7.03 | 8.31 | 7.9 | 7.0 | 7.0 | 7.0 |
| MgO    | 2.38 | 2.42 | 4.79 | 3.65 | —    | 7.58 | 5.3  | —    |
| CaO    | 4.76 | 4.85 | 5.07 | 5.13 | 3.27 | 2.91 | 10.0 | 14.0 |
| SrO    | 2.38 | 2.42 | 1.24 | 1.26 | —    | 4.66 | —    | 6.0  |
| BaO    | 2.38 | 2.42 | 4.24 | 4.29 | 9.57 | 3.49 | 4.7  | 6.0  |

|        | 32   | 33   | 34   | 35   | 36   | 37   |
|--------|------|------|------|------|------|------|
| $SiO_2$ | 66.9 | 66.5 | 67.4 | 66.9 | 65.3 | 66.9 |
| $Al_2O_3$ | 12.5 | 12.7 | 12.6 | 12.2 | 13.5 | 13.1 |
| $B_2O_3$ | 7.44 | 7.09 | 8.12 | 7.74 | 7.83 | 6.84 |
| MgO    | 2.46 | 3.04 | 2.47 | 2.46 | 2.49 | 2.46 |
| CaO    | 5.15 | 5.11 | 5.18 | 5.15 | 5.21 | 5.15 |
| SrO    | 1.26 | 1.25 | —    | —    | 1.27 | 1.26 |
| BaO    | 4.31 | 4.28 | 4.33 | 5.56 | 4.36 | 4.31 |

|        | 38   | 39   | 40   | 41   | 42   | 43   |
|--------|------|------|------|------|------|------|
| $SiO_2$ | 66.8 | 66.5 | 66.5 | 66.5 | 66.3 | 66.7 |
| $Al_2O_3$ | 12.3 | 12.7 | 12.7 | 12.7 | 12.4 | 12.4 |
| $B_2O_3$ | 7.42 | 6.5 | 6.5 | 6.5 | 6.48 | 7.11 |
| MgO    | 2.45 | 2.44 | 2.44 | 2.44 | 2.44 | 2.44 |
| CaO    | 5.14 | 5.11 | 5.11 | 6.31 | 5.1  | 5.13 |
| SrO    | 1.26 | 1.25 | 2.44 | 1.25 | 1.25 | —    |
| BaO    | 4.6  | 5.47 | 4.28 | 4.28 | 6.05 | 6.14 |

|        | 44   | 45   | 46   | 47   | 48   | 29   | 50   | 51   |
|--------|------|------|------|------|------|------|------|------|
| $SiO_2$ | 65.7 | 65.7 | 65.7 | 65.7 | 65.7 | 65.7 | 65.7 | 65.7 |
| $Al_2O_3$ | 11.6 | 11.6 | 11.6 | 11.6 | 11.6 | 11.6 | 11.6 | 11.6 |
| $B_2O_3$ | 7.74 | 7.74 | 7.74 | 7.74 | 7.74 | 7.74 | 7.74 | 7.74 |
| MgO    | 3.66 | 3.66 | 3.66 | 3.66 | 3.66 | 3.66 | 3.66 | 3.66 |
| CaO    | 5.15 | 5.15 | 5.15 | 5.15 | 5.15 | 5.15 | 5.15 | 5.15 |
| SrO    | 1.26 | 1.26 | 1.26 | 1.26 | 1.26 | 1.26 | 1.26 | 1.26 |
| BaO    | 4.31 | 4.31 | 4.31 | 4.31 | 4.31 | 4.31 | 4.31 | 4.31 |
| $Ta_2O_5$ | 0.45 | 0.3 | 0.15 | — | 0.45 | 0.3 | 0.15 | — |
| $Nb_2O_5$ | 0.15 | 0.3 | 0.45 | 0.6 | — | — | — | 0.3 |
| $Y_2O_3$ | — | — | — | — | 0.15 | 0.3 | 0.45 | 0.3 |

Examples 28-31 illustrate glasses having compositions close to, but somewhat outside of, the inventive ranges. Thus, the $SiO_2$ and BaO concentrations are too high in Example 28; the level of $SiO_2$ is low and that of MgO too high in Example 29; the content of $SiO_2$ is low in Example 30; and the amount of $SiO_2$ is low and that of CaO too high in Example 31.

Examples 16, 21, 22, 25, 26, and 27 constitute preferred compositions with Example 21 being the most preferred based upon its overall combination of chemical, physical, and melting properties.

We claim:

1. A substrate for a flat panel display device wherein said substrate is comprised of a flat, transparent glass exhibiting a strain point higher than 650° C., a linear coefficient of thermal expansion over the temperature range 0°–300° C. between $32\text{–}46\times10^{-7}/°$ C., and a weight loss of less than 2 mg/cm$^2$ after immersion for 24 hours in an aqueous 5% by weight HCl solution, said glass being essentially free from alkali metal oxides and consisting essentially, expressed in terms of mole percent on the oxide basis, of

| $SiO_2$ | 64–70 | $Y_2O_3$ | 0–5 |
| $Al_2O_3$ | 9.5–14 | MgO | 0–5 |
| $B_2O_3$ | 5–10 | CaO | 3–13 |
| $TiO_2$ | 0–5 | SrO | 0–5.5 |
| $T_2O_5$ | 0–5 | BaO | 2–7 |
| $Nb_2O_5$ | 0–5 | MgO + CaO + SrO + BaO | 10–20. |

2. A substrate according to claim 1 wherein the liquidus temperature of said glass is no higher than 1200° C.

3. A substrate according to claim 1 wherein the viscosity of said glass at the liquidus temperature thereof is greater than about 20,000 Pa.s.

4. A substrate according to claim 1 wherein said glass exhibits a melting viscosity of about 20 Pa.s at a temperature below 1675° C.

5. A substrate according to claim 1 wherein said glass exhibits a linear coefficient of thermal expansion between $32\text{–}40\times10^{-7}/°$ C.

6. A substrate according to claim 5 wherein silicon chips are mounted directed onto said glass utilizing chip-on-glass technology.

7. A substrate according to claim 5 wherein said glass is essentially free from alkali metal oxides and consists essentially, expressed in terms of mole percent on the oxide basis, of

| | | | |
|---|---|---|---|
| SiO$_2$ | 65–69 | Y$_2$O$_3$ | 0–3 |
| Al$_2$O$_3$ | 10–12 | MgO | 1–5 |
| B$_2$O$_3$ | 7–10 | CaO | 3–9 |
| TiO$_2$ | 0–3 | SrO | 1–3 |
| Ta$_2$O$_5$ | 0–3 | BaO | 2–5 |
| Nb$_2$O$_5$ | 0–3 | MgO + CaO + SrO + BaO | 11–16 | wherein the ratio Al$_2$O$_3$:B$_2$O$_3$ > 1.

8. A substrate according to claim 7 wherein the liquidus temperature of said glass is no higher than 1125° C.

9. A substrate according to claim 7 wherein the viscosity of said glass at the liquidus temperature thereof is greater than 60,000 Pa.s.

10. A substrate according to claim wherein said glass exhibits a melting viscosity of about 20 Pa.s at a temperature below 1675° C.

11. A substrate according to claim 7 wherein silicon chips are mounted directly onto said glass utilizing chip-on-glass technology.

12. A glass exhibiting a strain point higher than 650° C., a linear coefficient of thermal expansion over the temperature range 0°–300° C. between 32–46×10$^{-7}$/° C., and a weight loss of less than 2 mg/cm$^2$ after immersion for 24 hours in an aqueous 5% by weight HCl solution, said glass being essentially free from alkali metal oxides and consisting essentially, expressed in terms of mole percent on the oxide basis, of

| | | | |
|---|---|---|---|
| SiO$_2$ | 64–70 | Y$_2$O$_3$ | 0–5 |
| Al$_2$O$_3$ | 9.5–14 | MgO | 0–5 |
| B$_2$O$_3$ | 5–10 | CaO | 3–13 |
| TiO$_2$ | 0–5 | SrO | 0–5.5 |
| Ta$_2$O$_5$ | 0–5 | BaO | 2–7 |
| Nb$_2$O$_5$ | 0–5 | MgO + CaO + SrO + BaO | 10–20. |

13. A glass according to claim 12 wherein the liquidus temperature thereof is no higher than 1200° C.

14. A glass according to claim 12 wherein the viscosity thereof at the liquidus temperature is greater than about 20,000 Pa.s.

15. A glass according to claim 12 wherein said glass exhibits a melting viscosity of about 20 Pa.s at a temperature below 1675° C.

16. A glass according to claim 12 wherein said glass exhibits a linear coefficient of thermal expansion between 32–40×10$^{-7}$/° C.

17. A glass according to claim 16 wherein said glass consists essentially of

| | | | |
|---|---|---|---|
| SiO$_2$ | 65–69 | Y$_2$O$_3$ | 0–3 |
| Al$_2$O$_3$ | 10–12 | MgO | 1–5 |
| B$_2$O$_3$ | 7–10 | CaO | 3–9 |
| TiO$_2$ | 0–3 | SrO | 1–3 |
| Ta$_2$O$_5$ | 0–3 | BaO | 2–5 |
| Nb$_2$O$_5$ | 0–3 | MgO + CaO + SrO + BaO | 11–16 | wherein the ratio Al$_2$O$_3$:B$_2$O$_3$ > 1.

18. A glass according to claim 17 wherein the liquidus temperature thereof is no higher than 1125° C.

19. A glass according to claim 17 wherein the viscosity thereof at the liquidus temperature is greater than 60,000 Pa.s.

20. In a flat panel display device containing a flat, transparent glass substrate, the improvement wherein said glass exhibits a strain point higher than 650° C., a linear coefficient of thermal expansion over the temperature range of 0°–300° C. between 32–46×10$^{-7}$/° C., and a weight loss of less than 2 mg/cm$^2$ after immersion for 24 hours in an aqueous solution of 5% by weight HCl, said glass being essentially free from alkali metal oxides and consisting essentially, expressed in terms of mole percent on the oxide basis, of

| | | | |
|---|---|---|---|
| SiO$_2$ | 64–70 | Y$_2$O$_3$ | 0–5 |
| Al$_2$O$_3$ | 9.5–14 | MgO | 0–5 |
| B$_2$O$_3$ | 5–10 | CaO | 3–13 |
| TiO$_2$ | 0–5 | SrO | 0–5.5 |
| T$_2$O$_5$ | 0–5 | BaO | 2–7 |
| Nb$_2$O$_5$ | 0–5 | MgO + CaO + SrO + BaO | 10–20. |

21. In a flat panel display device according to claim 20 wherein the liquidus temperature of said glass is no higher than 1200° C.

22. In a flat panel display device according to claim 20 wherein the viscosity of said glass at the liquidus temperature thereof is greater than about 20,000 Pa.s.

23. In a flat panel display device according to claim 20 Wherein said glass exhibits a melting viscosity of about 20 Pa.s at a temperature below 1675° C.

24. In a flat panel display device according to claim 20 wherein said glass exhibits a linear coefficient of thermal expansion between 32–40×10$^{-7}$/° C.

25. In a flat panel display device according to claim 24 wherein silicon chips are mounted directly onto said glass utilizing chip-on-glass technology.

26. In a flat panel display device according to claim 24 wherein said glass is essentially free from alkali metal oxides and consists essentially, expressed in terms of mole percent on the oxide basis, of

| | | | |
|---|---|---|---|
| SiO$_2$ | 65–69 | Y$_2$O$_3$ | 0–3 |
| Al$_2$O$_3$ | 10–12 | MgO | 1–5 |
| B$_2$O$_3$ | 7–10 | CaO | 3–9 |
| TiO$_2$ | 0–3 | SrO | 1–3 |
| Ta$_2$O$_5$ | 0–3 | BaO | 2–5 |
| Nb$_2$O$_5$ | 0–3 | MgO + CaO + SrO + BaO | 11–16 | wherein the ratio Al$_2$O$_3$:B$_2$O$_3$.> 1.

27. In a flat panel display device according to claim 26 wherein the liquidus temperature of said glass in no higher than 1125° C.

28. In a flat panel display device according to claim 26 wherein the viscosity of said glass at the liquidus temperature thereof is greater than 60,000 Pa.s.

29. In a flat panel display device according to claim 26 wherein said glass exhibits a melting viscosity of about 20 Pa.s at a temperature below 1675° C.

30. In a flat panel display device according to claim 26 wherein silicon chips are mounted directly onto said glass utilizing chip-on-glass technology.

* * * * *